(12) United States Patent
Uzelac et al.

(10) Patent No.: US 8,345,978 B2
(45) Date of Patent: Jan. 1, 2013

(54) DETECTING POSITION OF WORD BREAKS IN A TEXTUAL LINE IMAGE

(75) Inventors: Aleksandar Uzelac, Seattle, WA (US); Bodin Dresevic, Bellevue, WA (US); Sasa Galic, Seattle, WA (US); Bogdan Radakovic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/749,599

(22) Filed: Mar. 30, 2010

(65) Prior Publication Data

US 2011/0243445 A1    Oct. 6, 2011

(51) Int. Cl.
    *G06K 9/00*    (2006.01)
(52) U.S. Cl. ....................................................... 382/177
(58) Field of Classification Search ............ 382/112, 382/170–171, 173–174, 176–181, 185–186, 382/190, 224, 226–231, 309–310; 715/256
    See application file for complete search history.

(56) References Cited

U.S. PATENT DOCUMENTS

| | | | |
|---|---|---|---|
| 5,768,414 A | 6/1998 | Jamali | |
| 6,108,444 A | 8/2000 | Syeda-Mahmood | |
| 6,178,270 B1 * | 1/2001 | Taylor et al. | 382/284 |
| 7,508,984 B2 * | 3/2009 | Ohguro | 382/181 |
| 7,801,358 B2 * | 9/2010 | Furmaniak et al. | 382/180 |
| 2004/0117192 A1 | 6/2004 | Miletzki | |
| 2005/0027511 A1 | 2/2005 | Ohguro | |
| 2005/0276480 A1 | 12/2005 | Li et al. | |
| 2008/0008386 A1 | 1/2008 | Anisimovich et al. | |

FOREIGN PATENT DOCUMENTS

| | | |
|---|---|---|
| JP | 05-028319 | 2/1993 |
| JP | 07-028930 | 1/1995 |
| JP | 07-319998 | 12/1995 |
| KR | 10-2009-0048707 | 7/1999 |

OTHER PUBLICATIONS

International Search Report in corresponding PCT Application No. PCT/US2011/029152, dated Nov. 1, 2011. 8 pages.
Agrawal, Mudit, "Re-Targetable OCR with Intelligent Character Segmentation", Retrieved at <<http://www.cs.umd.edu/Grad/scholarlypapers/papers/MuditAgrawal.pdf>>, Proceedings of the 2008 The Eighth IAPR International Workshop on Document Analysis Systems, Dec. 10, 2007, pp. 26.
Ashwin, et al., "A Font and Size-Independent OCR System for Printed Kannada Documents using Support Vector Machines", Retrieved at <<http://www.ias.ac.in/sadhana/Pdf2002Feb/pe992.pdf>>, vol. 27, Part 1, Feb. 2002, pp. 35-58.

* cited by examiner

*Primary Examiner* — Jose Couso
(74) *Attorney, Agent, or Firm* — Mayer & Williams P.C.

(57) ABSTRACT

Line segmentation in an OCR process is performed to detect the positions of words within an input textual line image by extracting features from the input to locate breaks and then classifying the breaks into one of two break classes which include inter-word breaks and inter-character breaks. An output including the bounding boxes of the detected words and a probability that a given break belongs to the identified class can then be provided to downstream OCR or other components for post-processing. Advantageously, by reducing line segmentation to the extraction of features, including the position of each break and the number of break features, and break classification, the task of line segmentation is made less complex but with no loss of generality.

19 Claims, 14 Drawing Sheets

DETECTING POSITION OF WORD BREAKS IN A TEXTUAL LINE IMAGE

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is obtained from a book or when it is generated by an image-based scanner, because in these cases the text/picture is scanned from a distance, from varying orientations, and in varying illumination. Even if the performance of the scanning process is good, the performance of the OCR engine may be degraded when a relatively low quality page of text is being scanned.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Line segmentation in an OCR process is performed to detect the positions of words within an input textual line image by extracting features from the input to locate breaks and then classifying the breaks into one of two break classes which include inter-word breaks and inter-character breaks. An output including the bounding boxes of the detected words and a probability that a given break belongs to the identified class can then be provided to downstream OCR or other components for post-processing. Advantageously, by reducing line segmentation to the extraction of features, including the position of each break and the number of break features, and break classification, the task of line segmentation is made less complex but with no loss of generality.

In illustrative examples, a line segmentation engine that implements both a featurization component and a break classifier is configured in an architecture without word recognition capabilities. In this architecture, the line segmentation engine is placed between pre-processing stages (which generate, for example, an input gray-scale textual line image from a scanned document) and a standalone word recognizer that will typically not consider correcting any inter-word break errors made by the classifier. In an alternative architecture, the line segmentation engine and word recognizer are integrally deployed. In this latter architecture, a word break lattice is generated from the detected breaks for a given textual line. Each word in the lattice is detected by the word recognizer and word recognition features such as word confidence, character confidence, word frequency, grammar, and word length may be extracted. A word break beam search engine then uses the extracted word and break features to select a more optimal line segmentation by employing more information in the decision making process as compared with the standalone architecture.

Various combinations of features may be extracted from the textual line image for featurization including absolute features, relative line features, relative break features, relative ink features, relative ink-to-ink features, relative break proximity features, and word recognition features. A variety of break classifiers may be utilized including decision tree classifiers, AdaBoost classifiers, clustering classifiers, neural network classifiers, and iterative gradient descender classifiers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numbers indicate like elements in the drawings.

DETAILED DESCRIPTION

Figure 1:
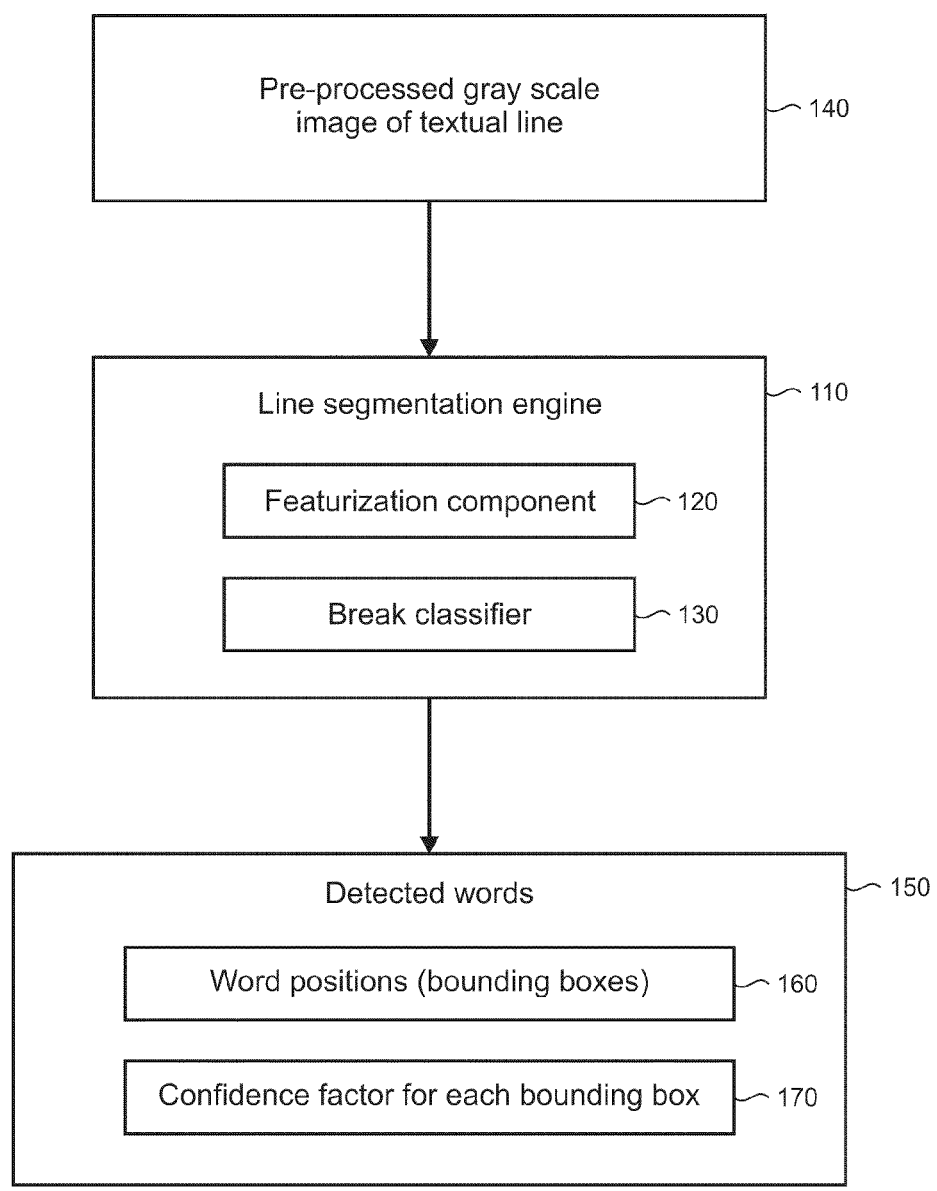
FIG. 1 shows a simplified functional block diagram of an illustrative line segmentation engine.

FIG. 1 shows an illustrative high level line segmentation architecture 100 which highlights features of the present line segmentation techniques. In an illustrative example, the line segmentation techniques may be implemented using an engine, as represented by block 110 in architecture 100 that includes featurization component 120 and classifier 130 that typically implement, respectively, featurization and classification algorithms. As shown, the input to the document line segmentation engine 110 is a pre-processed gray-scale image 140 of a single textual line. The input image is pre-processed to the extent needed so that background color variations are canceled or removed and replaced by the color white. The foreground colors, which are referred to as "ink," are converted to gray-scale. The output of the line segmentation engine will be a set of one or more detected words 150 including word positions as typically represented by bounding boxes 160 (i.e., one bounding box for each of the individual words), and an associated confidence factor 170 for each of the output bounding boxes.

Rather than having to directly detect coordinates of word bounding boxes for each word in a given textual line image, the present line segmentation technique functions to classify each break into one of two break classes. A break is said to exist at some position in the textual line image if a straight line can be drawn from the top to the bottom of the line at that position without encountering (i.e., touching) an "ink" An alternative way to explain the meaning of a break is to project the ink vertically. In this case, a break exists where the ink projection is empty (i.e., no ink projected). This alternative explanation is graphically demonstrated in FIG. 2. The top row includes an exemplary textual line image 210. The middle row shows the ink projection 220, and the bottom row shows the breaks 230 where the ink projection is empty. As may be observed in FIG. 2, there are only two classes of breaks: inter-word breaks (representatively indicated by reference number 240) and inter-character breaks (representatively indicated by reference number 250).

Advantageously, by extracting textual line image features, including the position of each break and the number of break features, the problem of line segmentation is made less complex. In addition, it has been shown empirically that utilization of the present line segmentation results in no loss of generality. Accordingly, the line segmentation engine 110 in FIG. 1 will implement break classification in two stages, featurization and classification, and will return a target class for each break as well as a probability that a given break belongs to the target class. Such techniques can be applied, for example, to Latin, Cyrillic, Greek, and East Asian scripts. Note that not all inter-character breaks 250 have to be present in order to achieve satisfactory line segmentation using the present technique, but rather only a relatively high percentage (for example, 99.5%, as empirically established) of inter-word breaks 240. Any inaccuracies produced by the present line segmentation such as false positive inter-word misclassification can be addressed in a post-processing step called "soft word breaking" which is implemented as a part of the word recognizer component. The featurization and classification stages of the present technique are discussed in turn below.

Figure 3:
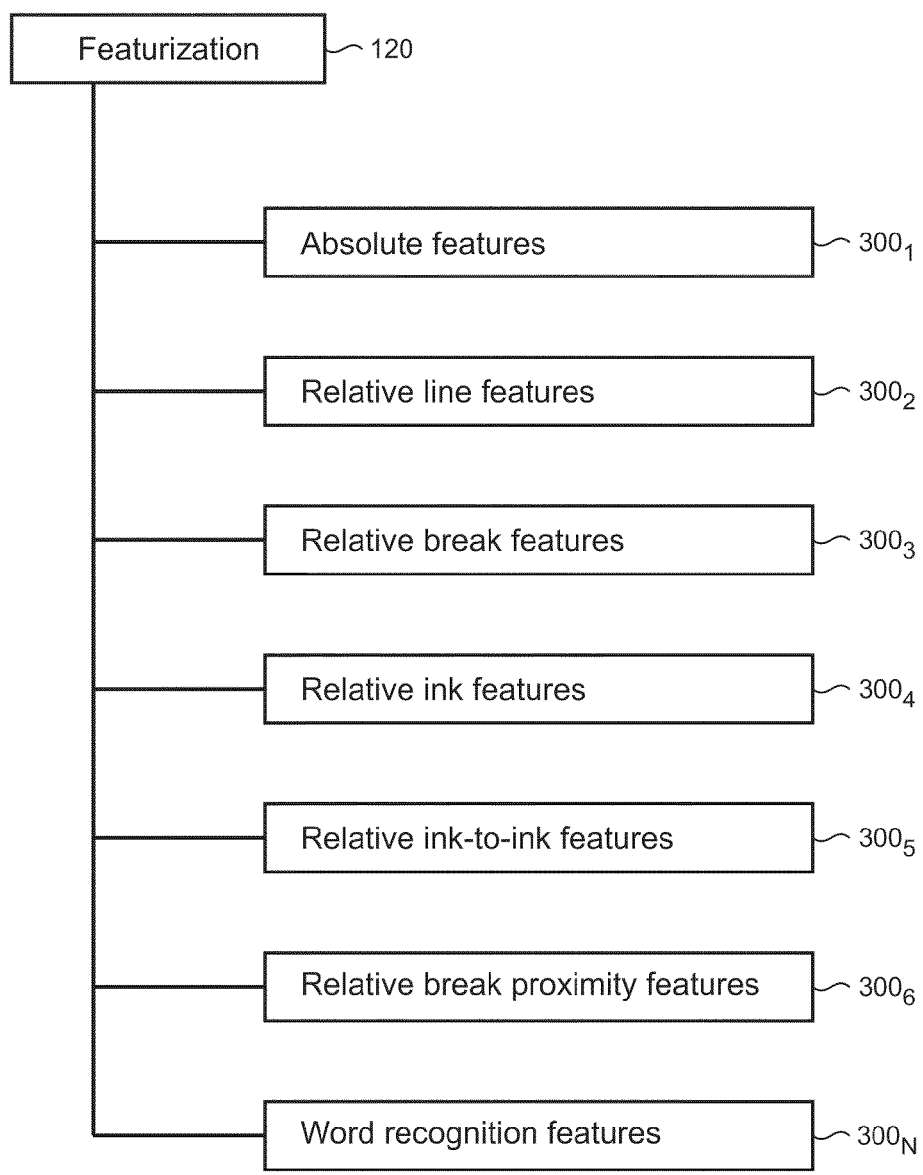
FIG. 3 shows an illustrative taxonomy of features that may used in the featurization stage of the present line segmentation process.

Featurization—Featurization may be defined as the process of extracting numeric features from an input textual line image. Using this definition, featurization is generally known and may be considered straight forward. However, there are particular features that may be beneficially utilized with the present line segmentation as listed in FIGS. 3 to 5 and 8 to 14. More specifically, FIG. 3 shows an illustrative taxonomy of features 300 that may be used in the featurization stage. It is emphasized that the particular features utilized in any given usage scenario may vary. In addition, not all of the features shown and described need to be used in every case. Instead, utilization of a subset of features may more optimally suit the needs of a particular implementation of the present line segmentation.

As shown in FIG. 3, the featurization component 120 can utilize a variety of features that fall into different feature categories. These include absolute features (noted by reference number $300_1$), relative line features $300_2$, relative break features $300_3$, relative ink features $300_4$, relative ink-to-ink features $300_5$, relative break proximity features $300_6$, and word recognition features $300_N$.

Figure 4:
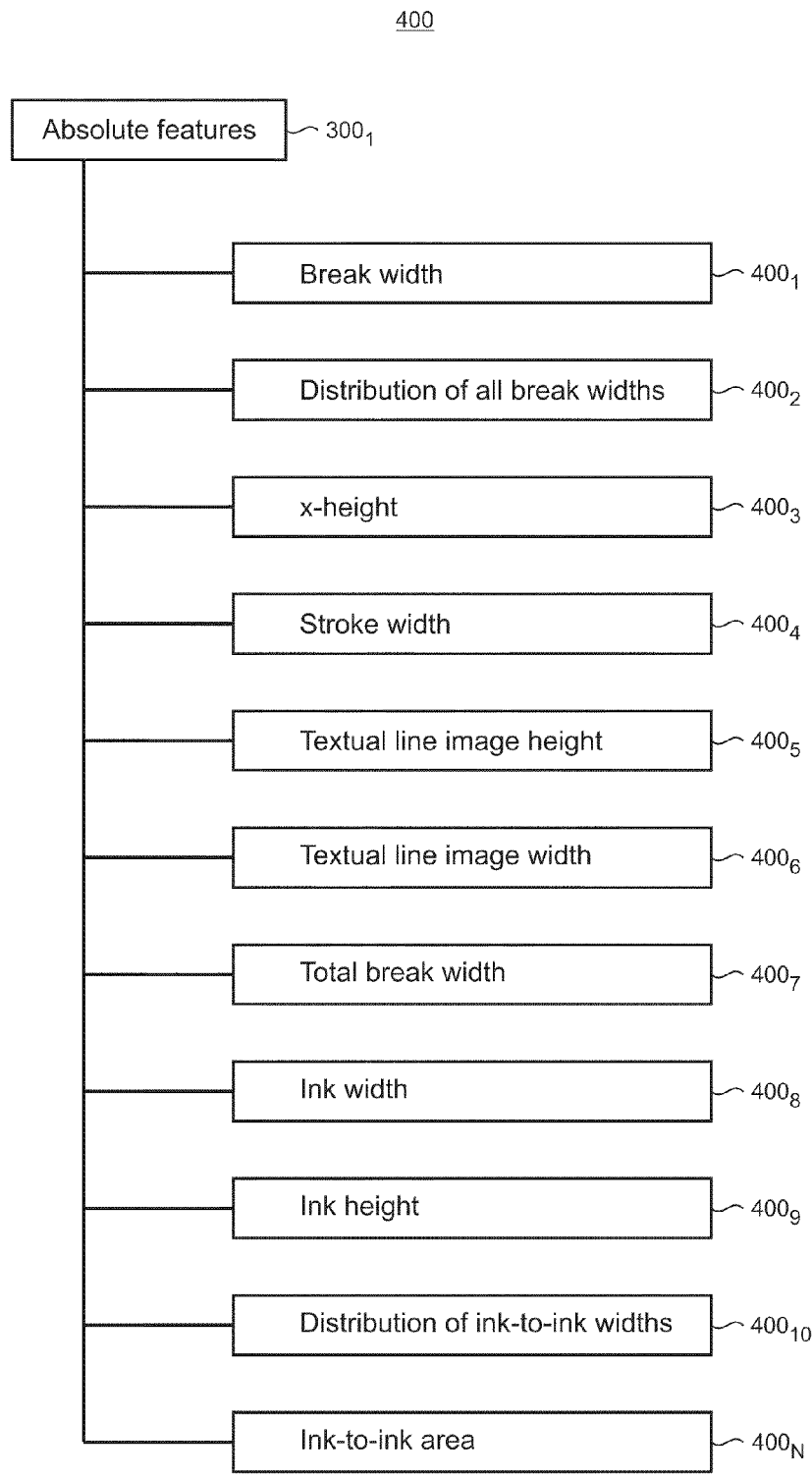
FIG. 4 shows an illustrative set of absolute features.
Figure 5:
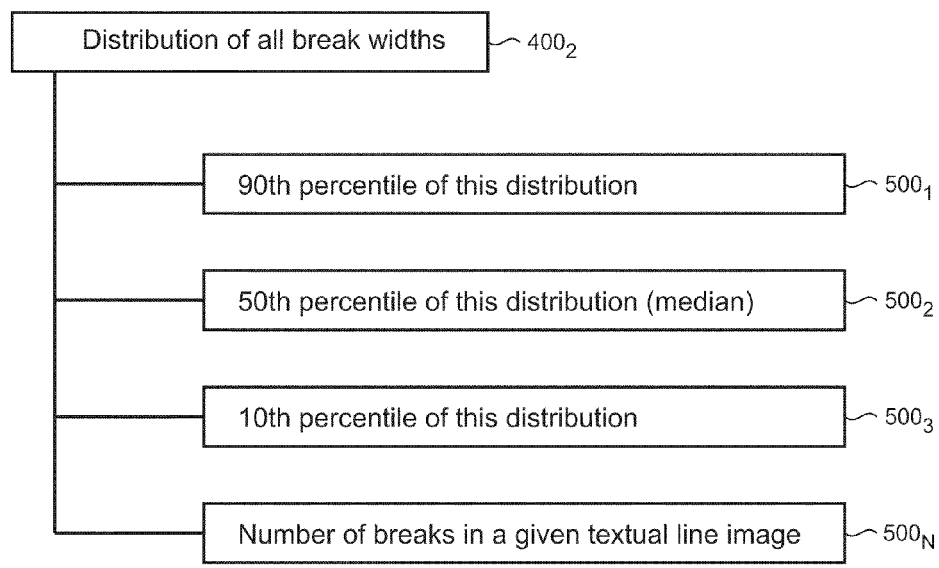
FIG. 5 shows an illustrative distribution of all break widths.

An illustrative set of absolute features 400 is shown in FIG. 4. The set 400 includes the break width, as measured in pixels, for each break in a given textual line image (as indicated by reference number $400_1$). The distribution of all break widths $400_2$, in pixels, can also be used. As shown in FIG. 5, a given distribution of all break widths $400_2$ may include the $90^{th}$ percentile of the distribution $500_1$, the $50^{th}$ percentile of the distribution $500_2$, the $10^{th}$ percentile of the distribution $500_3$, and the number of breaks in the textual line image $500_N$.

Figure 6:
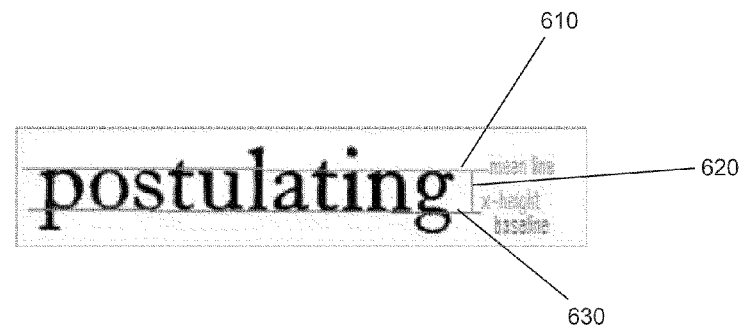
FIG. 6 shows a graphical representation of baseline, mean line, and x-height for an exemplary word.

Returning to FIG. 4, the set of absolute features 400 further includes x-height $400_3$, which is defined as the difference between baseline and mean line where the baseline is the line upon which most of the characters "sit" in a textual line image and the mean line is the line under which most of the characters "hang". The mean line, x-height, and baseline as defined above, are illustrated in FIG. 6 using the blue, green, and red lines as respectively indicated by reference numbers 610, 620, and 630.

The set of absolute features 400 further includes stroke width $400_4$, as measured in pixels, textual line image height $400_5$ in pixels, textual line image width $400_6$ in pixels, total break width $400_7$ (which is the sum of all break widths in pixels), ink width $400_8$ in pixels, ink height $400_9$ in pixels, the distribution of ink-to-ink widths $400_{10}$ in pixels, and the ink-to-ink area $400_N$.

Figure 2:
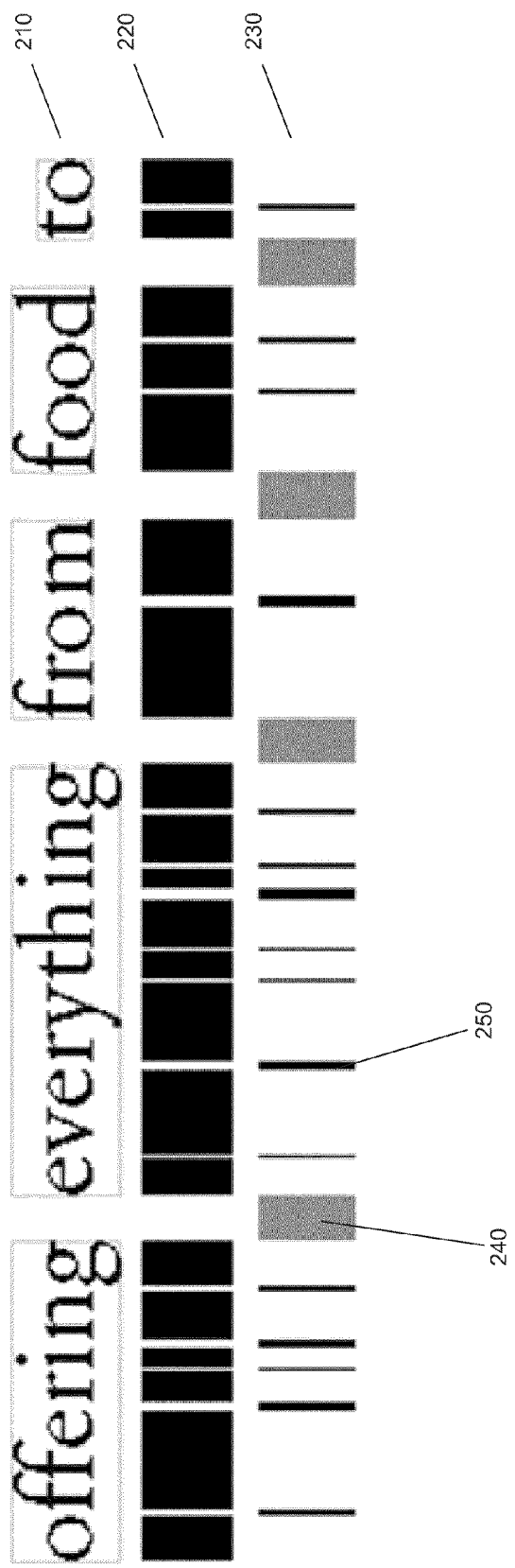
FIG. 2 shows an illustrative break classification example with "ink" projection.
Figure 7:
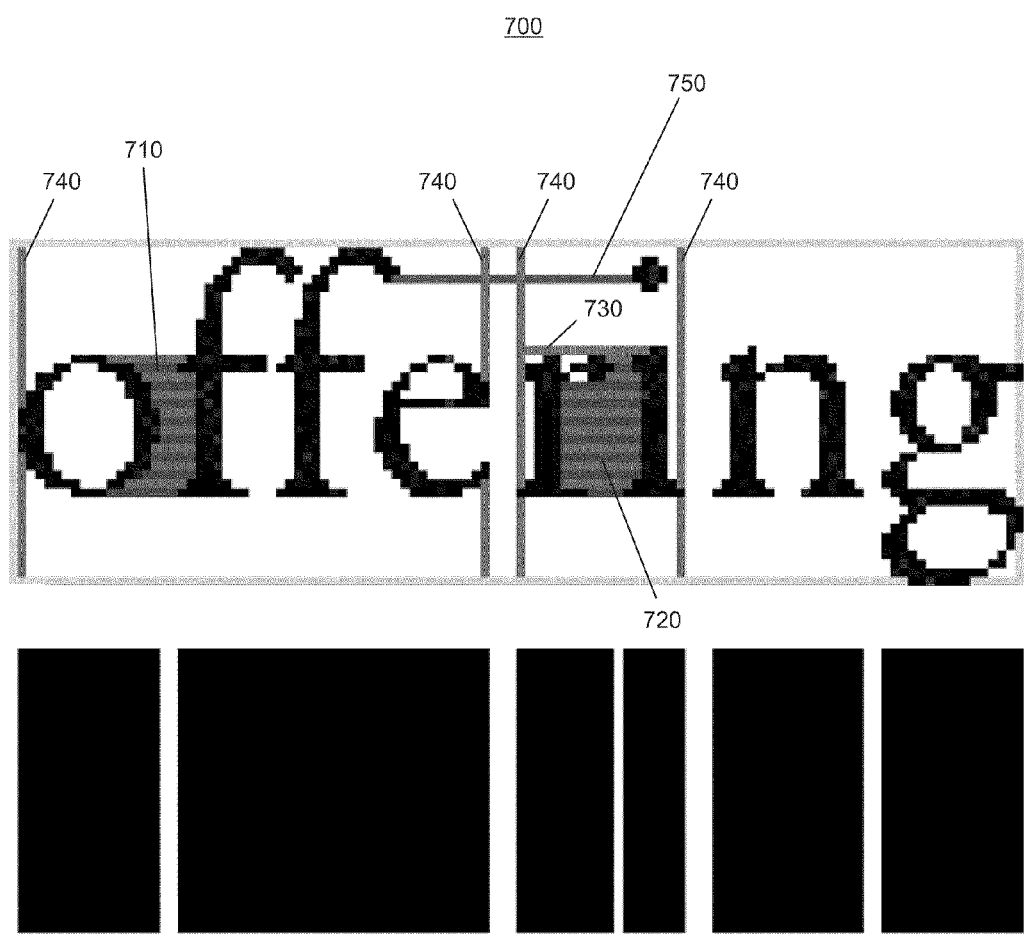
FIG. 7 shows an illustrative example of an ink-to-ink feature set.

With regard to the ink-to-ink features ($400_{10}$ and $400_N$), attention is directed to FIG. 7 where the first word (as indicated by reference number 700) from the textual line image in FIG. 2 is presented in an enlarged view. This example considers the first and the third break (both are inter-character breaks, but the same explanation would be applicable to any inter-word break). The first and third breaks are shown in red (two shades of red for better visibility and respectively indicated by reference numbers 710 and 720) and are valid ink-to-ink lines by being horizontal lines connecting two inks across any given break, but only for the common horizontal pixels of the two inks in question. Thus, for example, the purple line 730 in the third break is an invalid ink-to-ink line because the top right ink pixel does not have its left counterpart so that the purple line 730 spans up to a green line 740 (a break boundary). Furthermore, to be valid, an ink-to-ink line cannot span across other breaks. Thus, for example, the blue line 750 in the third break is spanning across the green break boundary lines. So while both left and right pixel counterparts exist, the blue line 750 is not a valid ink-to-ink line.

Figure 8:
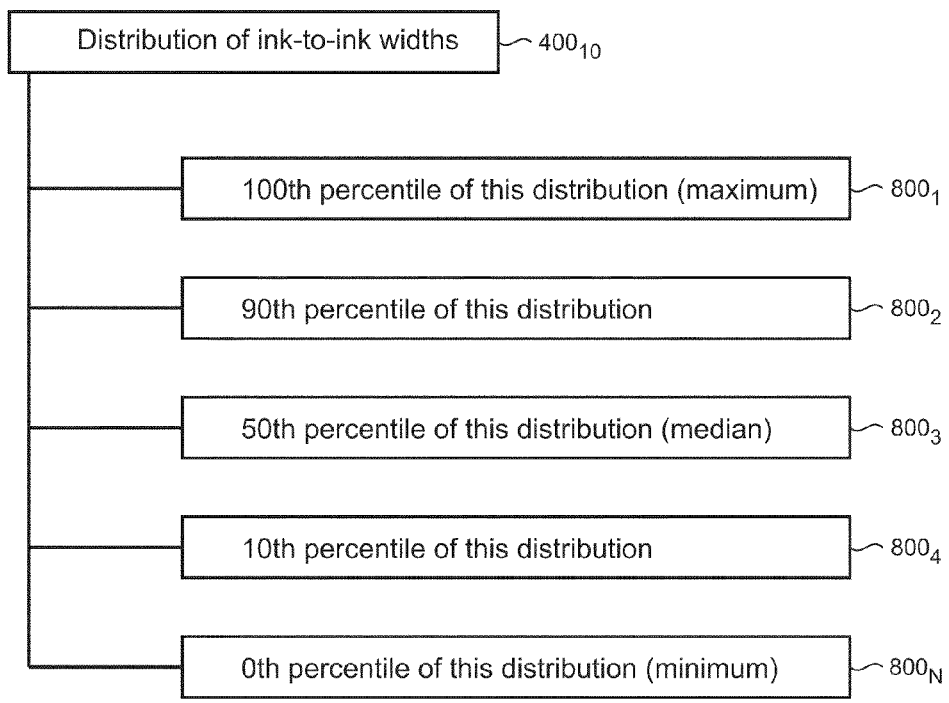
FIG. 8 shows an illustrative distribution of ink-to-ink widths.

Once the ink-to-ink lines are defined, a distribution of ink-to-ink line widths may be established for each break. It may be observed that the $0^{th}$ percentile of ink-to-ink line widths (the minimum) will typically be greater than or equal to the actual break width. This is demonstrated by the first break 710 in FIG. 7. Accordingly, as shown in FIG. 8, the distribution of ink-to-ink widths $400_{10}$ in the absolute features $300_1$ can include the $100^{th}$ percentile of the distribution (as indicated by reference number $800_1$) which is the maximum, the $90^{th}$ percentile of the distribution $800_2$, the $50^{th}$ percentile of the distribution $800_3$ which is the median, the $10^{th}$ percentile of the distribution $800_4$, and the $0^{th}$ percentile of the distribution $800_N$ which is the minimum.

Figure 9:
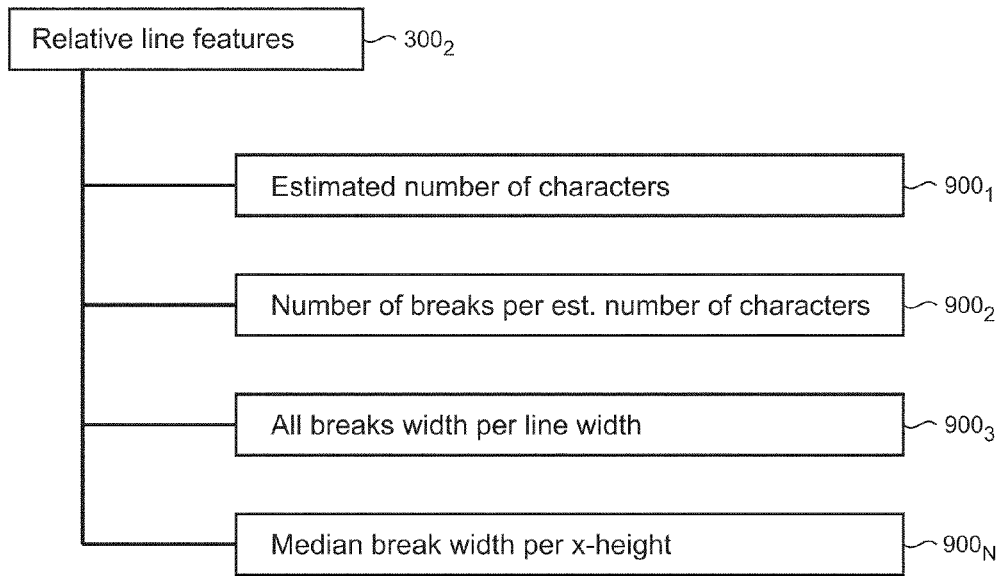
FIG. 9 shows an illustrative set of relative line features.

As shown in FIG. 9, the relative line features $300_2$ may include, for example, the estimated number of characters $900_1$ in the input textual line image. This is an approximation of the number of characters in the textual line image which is calculated as (textual line image width−total break width)/x-height. The relative line features $300_2$ may further include the number of breaks per estimated number of characters $900_2$. This is calculated as the number of breaks in a given textual line image/estimated number of characters.

The relative line features $300_2$ may further include all breaks width per line width $900_3$. This is calculated as total break width/textual line image width. The median break width per x-height $900_N$ may also be included in the relative line features $300_2$. This is calculated as the $50^{th}$ percentile of the break distribution/x-height.

Figure 10:
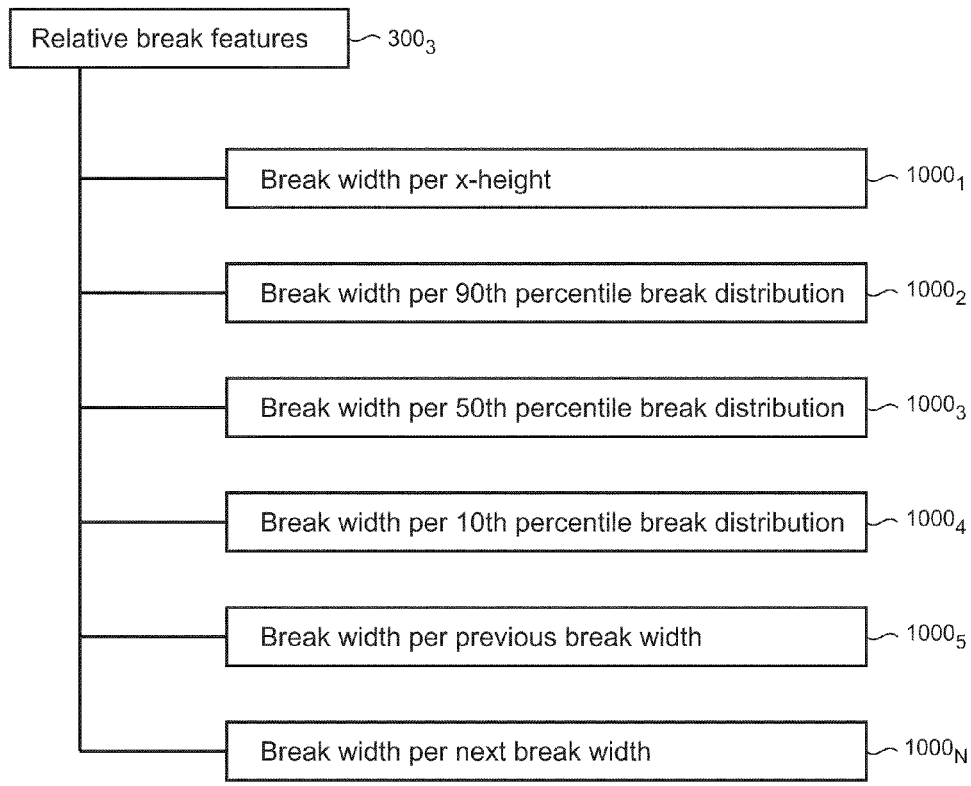
FIG. 10 shows an illustrative set of relative break features.

As shown in FIG. 10, the relative break features $300_3$ may include, for example, break width per x-height $1000_1$. This is calculated as break width/x-height. The relative break features $300_3$ may further include break width per 90th percentile break distribution $1000_2$. This is calculated as break width/90th percentile of break distribution. The relative break features $300_3$ may further include break width per 50th percentile break distribution $1000_3$. This is calculated as break width/50th percentile of break distribution. The relative break features $300_3$ may further include break width per 10th percentile break distribution $1000_4$. This is calculated as break width/10th percentile of break distribution.

The relative break features $300_3$ may further include break width per previous break width $1000_5$, where −1 is for the first break in the given textual line image. The relative break features $300_3$ may further include break width per next break width $1000_N$, where −1 is for the last break in the given textual line image.

Figure 11:
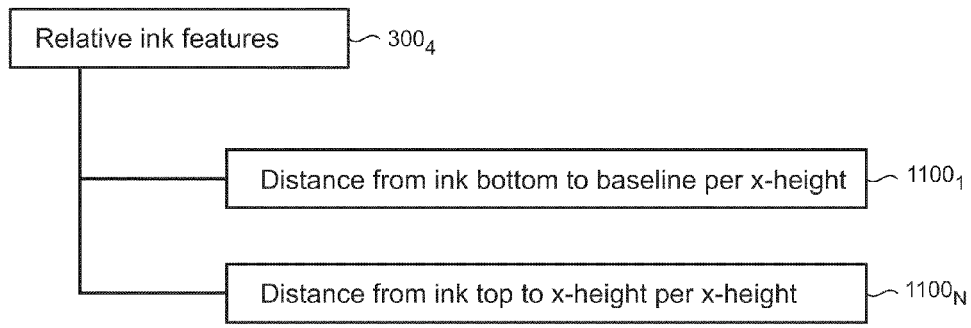
FIG. 11 shows an illustrative set of relative ink features.

As shown in FIG. 11, the relative ink features $300_4$ may include, for example, the distance from ink bottom to the baseline per x-height $1100_1$. This is calculated as the distance from ink bottom to the baseline/x-height. The relative ink features $300_4$ may also include the distance from ink top to the x-height per x-height $1100_N$. This is calculated as the distance from ink top to the x-height/x-height.

Figure 12:
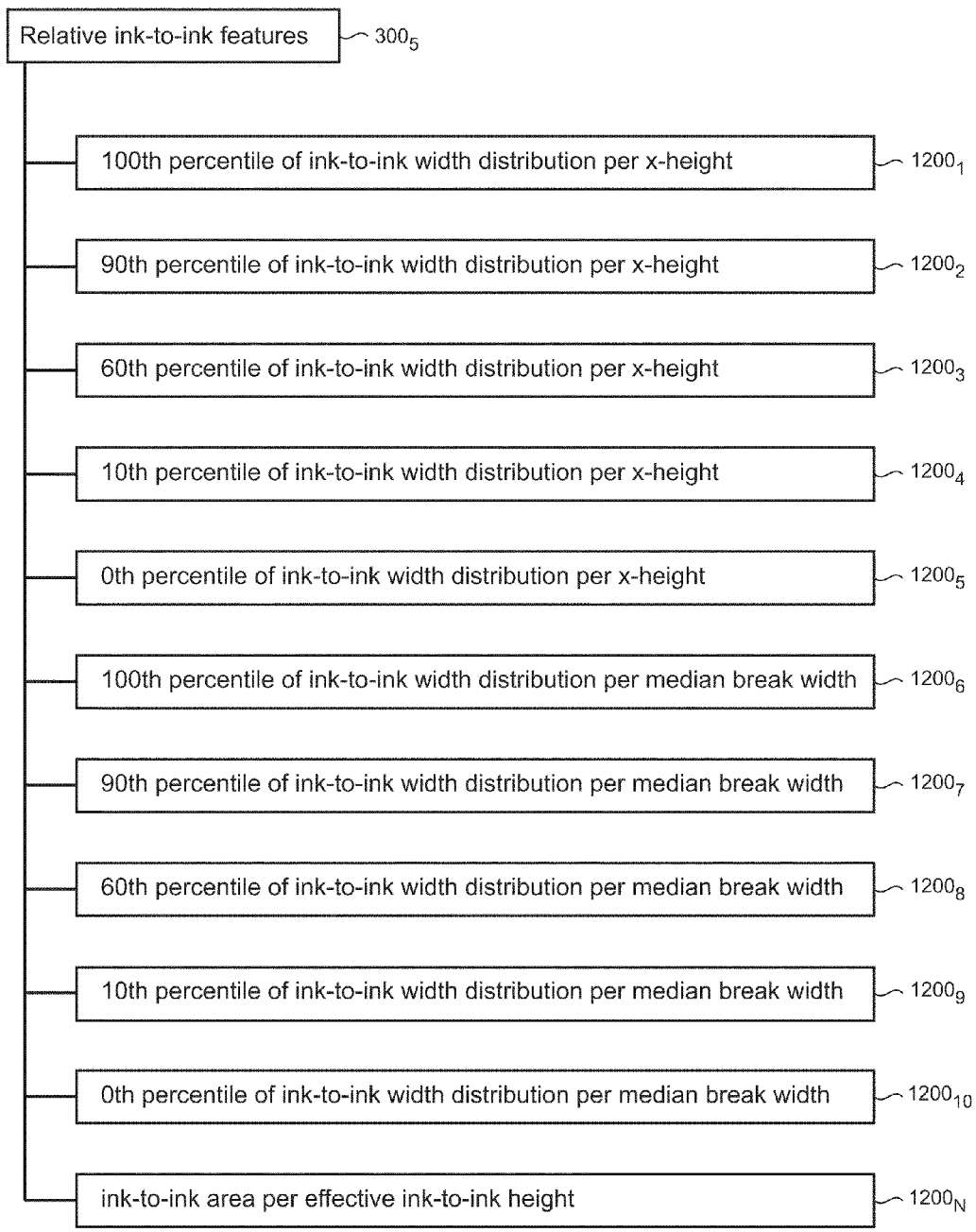
FIG. 12 shows an illustrative set of relative ink-to-ink features.

As shown in FIG. 12, the relative ink-to-ink features $300_5$ may include, for example, the 100th percentile of ink-to-ink width distribution per x-height $1200_1$, the 90th percentile of ink-to-ink width distribution per x-height $1200_2$, the 60th percentile of ink-to-ink width distribution per x-height $1200_3$, the 10th percentile of ink-to-ink width distribution per x-height $1200_4$, the 0th percentile of ink-to-ink width distribution per x-height $1200_5$, the 100th percentile of ink-to-ink width distribution per median break width $1200_6$, the 90th percentile of ink-to-ink width distribution per median break width $1200_7$, the 60th percentile of ink-to-ink width distribution per median break width $1200_8$, the 10th percentile of ink-to-ink width distribution per median break width $1200_9$, the 0th percentile of ink-to-ink width distribution per median break width $1200_{10}$, and the ink-to-ink area per effective ink-to-ink height $1200_N$.

Figure 13:
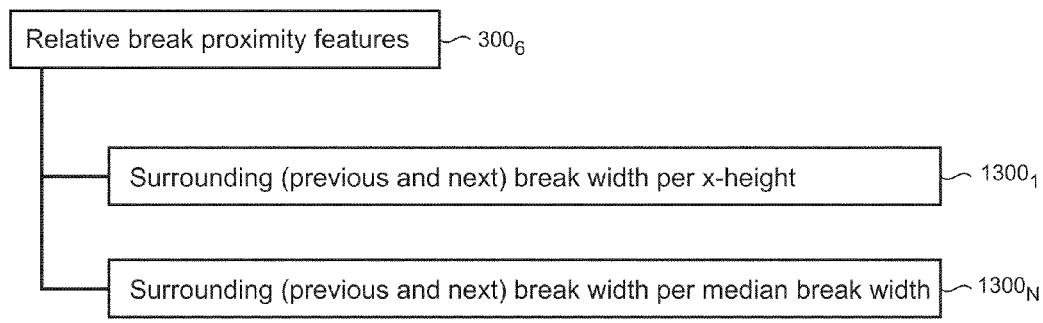
FIG. 13 shows an illustrative set of relative break proximity features.

As shown in FIG. 13, the relative break proximity features $300_6$ may include, for example, the surrounding (previous and next) break width per x-height $1300_1$, and the surrounding (previous and next) break width per median break width $1300_N$.

Figure 14:
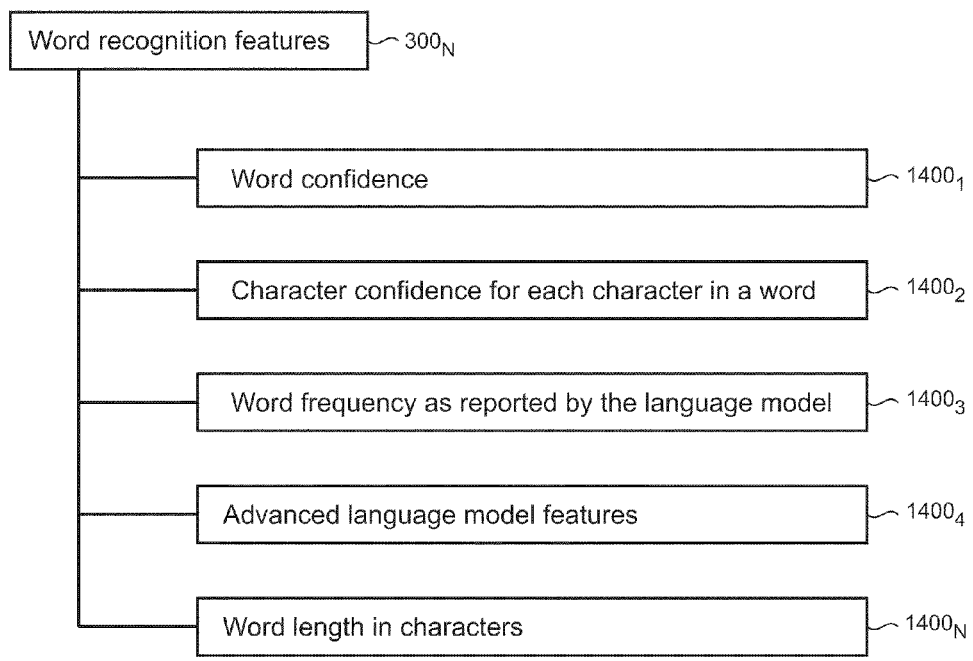
FIG. 14 shows an illustrative set of word recognition features.

As shown in FIG. 14, the word recognition features $300_N$ may include, for example, word confidence $1400_1$, character confidence for each character in a word $1400_2$, word frequency $1400_3$ as reported by a particular language model that is utilized, advanced language model features $1400_4$ (such as grammar, indicating if the given set of words is in accordance with some grammar rules, in probability, if not exactly), and word length in characters $1400_N$.

Figure 15:
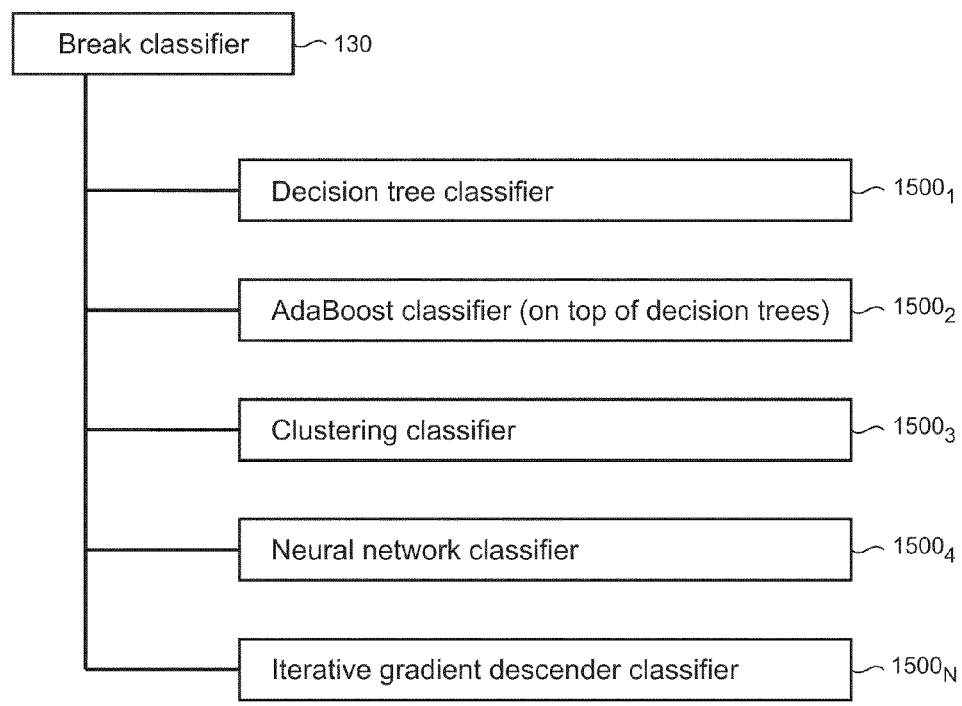
FIG. 15 shows an illustrative set of classifiers, one or more of which may be used with one or more subsets of the features shown in FIG. 3.

Classification—in the classification stage, one or more of the classifiers shown in FIG. 15 may be utilized in conjunction with one or more of the features described above. These classifiers include, for example, a decision tree classifier $1500_1$, AdaBoost classifier $1500_2$ which is typically implemented on top of the decision tree classifier, a clustering classifier $1500_3$ such as FCM (Fuzzy C Means) or K-Means, a neural network classifier $1500_4$, and an iterative gradient descender classifier $1500_N$. In some usage scenarios, a classifier can be trained to penalize false positives in favor of the false negative inter-word break class. It is further noted that all of the listed classifiers have an ability to provide the confidence associated with an identification of a break as belonging to one of the two break classes.

The classifiers 1500 may also be trained using the results from engines that are upstream and downstream in an OCR system pipeline to improve end-to-end accuracy. Alternatively, the classifiers 1500 may be trained using an independent scope implementation. In this case, the engines in the OCR system are trained using the same labeled data. This technique can typically be expected to provide optimal generic accuracy for applications that are outside the OCR system, such as line segmentation of handwriting.

The first four classifiers $1500_{1-4}$ may be implemented conventionally without the necessity of further discussion. However, further description of the iterative gradient descender classifier $1500_N$ is warranted and presented below.

Let $\{b_1, b_2, \ldots, b_n\}$ be a set of breaks to classify as inter-word break (BW) or inter-character break (BC). This set is ordered, which means that a break with a higher index appears after a break with a lower index. This observation allows the set of breaks to be considered as a sequence. Now, the problem of classifying each break independently transforms to a problem of finding the most probable sequence of breaks. This can be accomplished using the well-known Hidden Markov Model (HMM) technique.

In order to use the HMM technique, state and transition probabilities are defined. If $F=\{f_1, f_2, \ldots, f_m\}$ is the set of break features, then these probabilities may be defined as $$p_s(b_i)=p_s(F,bc,bw)$$

$$p_t=p_t(F,bc,bw)$$

where bc and bw are median inter-character break and median inter-word break.

Unfortunately, the median values are unknown by prior classification. To cope with this problem, an iterative gradient descender technique may be utilized. In the first iteration, it may be said that $bc=b_{min}$ and $bw=b_{max}$. Under this assumption, the most probable sequence can be found using the well-known Viterbi algorithm. Once the most probable sequence is found, the real median values $bc_1$ and $bw_1$ may be computed based on the Viterbi algorithm results. The old values are then updated according to the rule $$bc=bc+\eta(bc-bc_1)$$

$$bw=bw+\eta(bw-bw_1)$$

where $\eta$ is the learning rate.

After updating the median values, the most probable sequence is computed again, the current median values are updated, and so forth. This iterative process terminates once the median values become stable (i.e., they do not change anymore). The most probable sequence at this stage is the final result of classification.

Once the classification is finished, a validation step may be performed. This step assumes that word lengths are computed according to classification results. If the presence of a very long word or too many very short words is detected, this is an indication that the iterative gradient descender algorithm converged to the wrong minimum as a result of wrongly chosen initial median values. The initial median values may, therefore, be changed and the algorithm started again. This is repeated until validation is passed.

As a simple example, it may be considered that the only feature used is break width in pixels, thus $F=\{f_1\}$. The probabilities may be defined as $$p_s(b_i = BC) = \begin{cases} 0, & \text{width}(b_i) \geq bw \\ \dfrac{\text{width}(b_i) - bc}{bw - bc}, & cb < \text{width}(b_i) < bw \\ 1, & \text{width}(b_i) \leq bc \end{cases}$$

$$p_s(b_i = BW) = 1 - p_s(b_i = BC)$$

$$p_t(b_i = BW \mid b_{i-1} = BC) = \begin{cases} 0; & \text{width}(b_i) - \text{width}(b_{i-1}) \leq 0 \\ \dfrac{\text{width}(b_i) - \text{width}(b_{i-1}) + bc - bw}{(bc - bw)}; & 0 < \text{width}(b_i) - \text{width}(b_{i-1}) < (bw - bc) \\ 1; & \text{width}(b_i) - \text{width}(b_{i-1}) \geq (bw - bc) \end{cases}$$

$$p_t(b_i = BC \mid b_{i-1} = BC) = 1 - p_t(b_i = BW \mid b_{i-1} = BC)$$

$$p_t(b_i = BC \mid b_{i-1} = BW) = \begin{cases} 0; & \text{width}(b_{i-1}) - \text{width}(b_i) \leq 0 \\ \dfrac{\text{width}(b_{i-1}) - \text{width}(b_i) + bc - bw}{(bc - bw)}; & 0 < \text{width}(b_{i-1}) - \text{width}(b_i) < (bw - bc) \\ 1; & \text{width}(b_{i-1}) - \text{width}(b_i) \geq (bw - bc) \end{cases}$$

$$p_t(b_i = BW \mid b_{i-1} = BW) = 1 - p_t(b_i = BC \mid b_{i-1} = BW)$$

Figure 16:
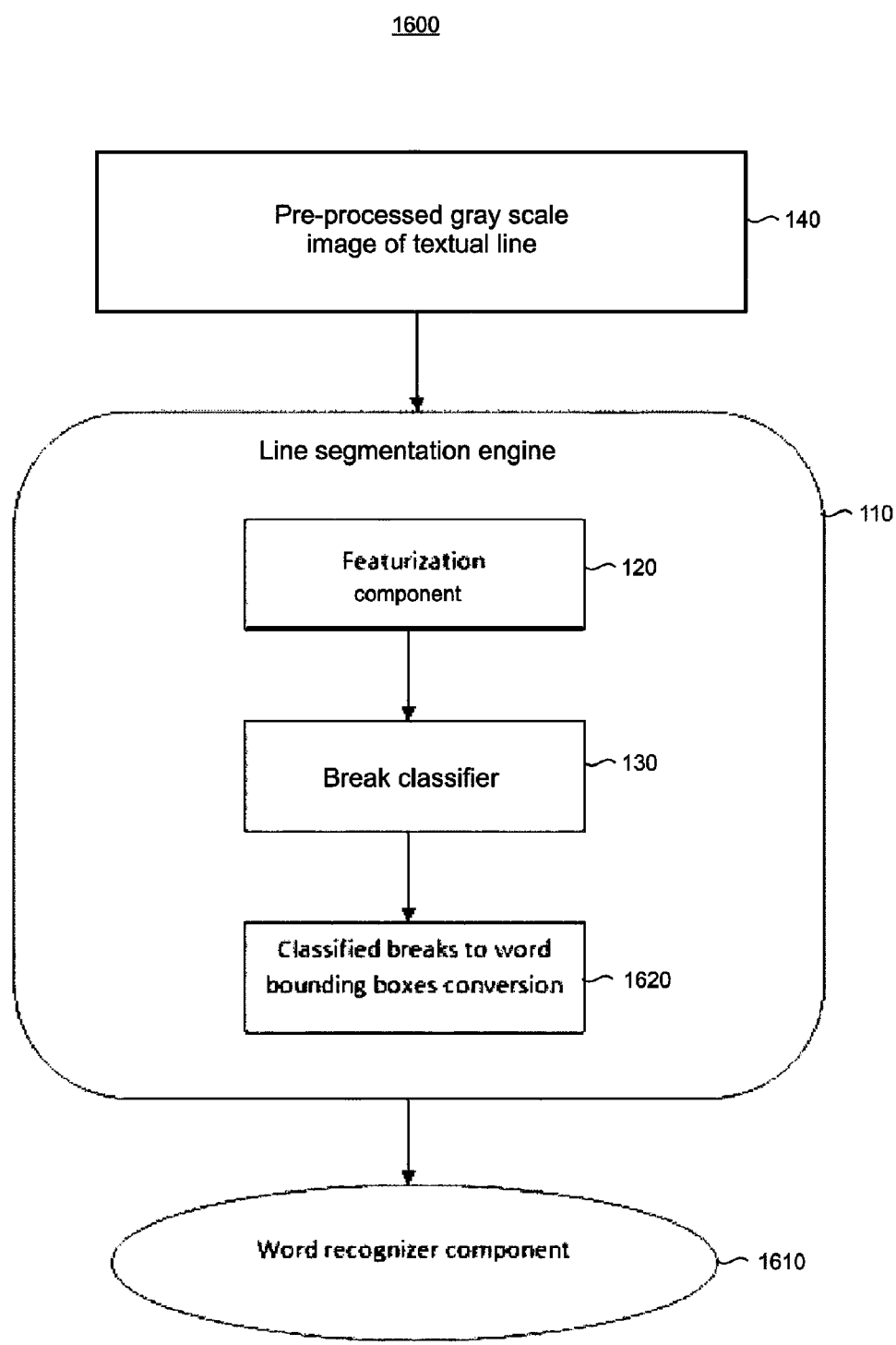
FIG. 16 shows a first illustrative architecture in which a line segmentation engine provides an output to an external word recognizer, as for example, in an OCR system.

FIG. 16 shows a first illustrative architecture 1600 in which the present line segmentation engine 110 (which includes the featurization component 120 and break classifier 130) provides an output to a standalone word recognizer 1610, as for example, in an OCR system. As shown in FIG. 16, the input to the word recognizer 1610 is generated by using a break to bounding box conversion process, as indicated by reference number 1620. In this implementation using the architecture 1600, the word recognizer 1610 will not consider correcting any inter-word break mistakes. However, in some applications, the word recognizer 1610 may still correct some inter-character break errors, depending on whether, and what type of "soft word breaking" implementation is utilized. However, in the architecture 1600, the line segmentation/break classification uses only the information contained in the input textual line image (i.e., the extracted features) itself to detect the individual words in textual line.

Figure 17:
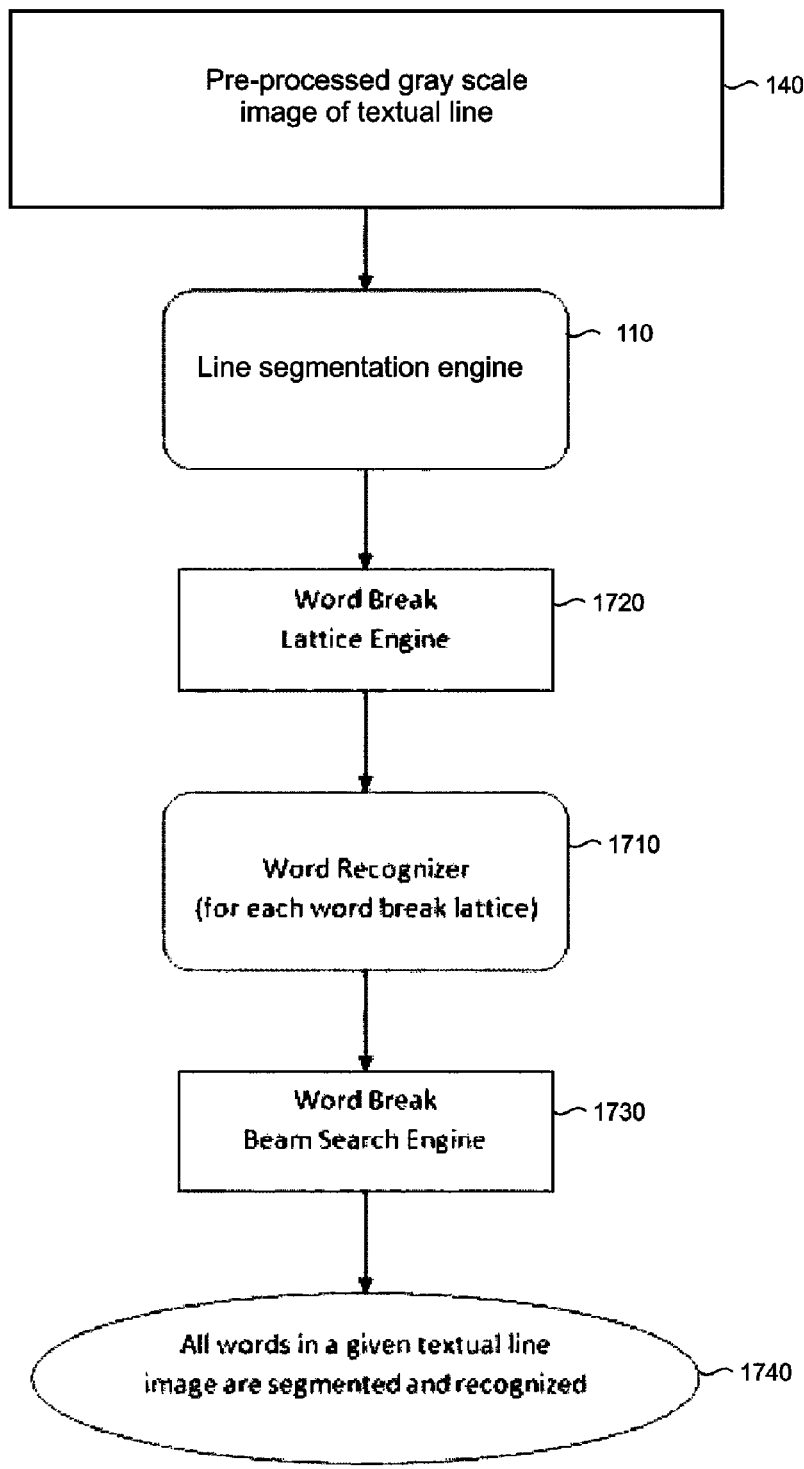
FIG. 17 shows a second illustrative architecture in which a line segmentation engine is integrally deployed with a word recognizer.

FIG. 17 shows a second illustrative architecture 1700 in which the line segmentation engine 110 is integrally deployed with a word recognizer 1710, for example, when word recognizer features are available. In this implementation using the architecture 1700, the word recognizer 1710 is used to provide results for an entire word breaking lattice for a given textual line (as generated by a word break lattice engine 1720), while a word breaking beam search as provided by an engine 1730 is utilized to generate the final outcome 1740 where all the words in a given textual line are segmented and recognized. The word break lattice engine 1720 and word break beam search engine 1730 may be implemented conventionally.

The word recognizer 1610 may typically support capabilities such as word confidence, character confidence, word frequency, grammar, and word length. Using this information, the line segmentation uses much more of the available information (as compared with the architecture 1600 discussed above) before a final line segmentation call is made, since the actual results of downstream OCR processes for the textual line in question can be employed. That is, the word breaking beam engine is provided with several possible outcomes that may be correct, from which it can pick the more optimal line segmentation outcome.

Figure 18:
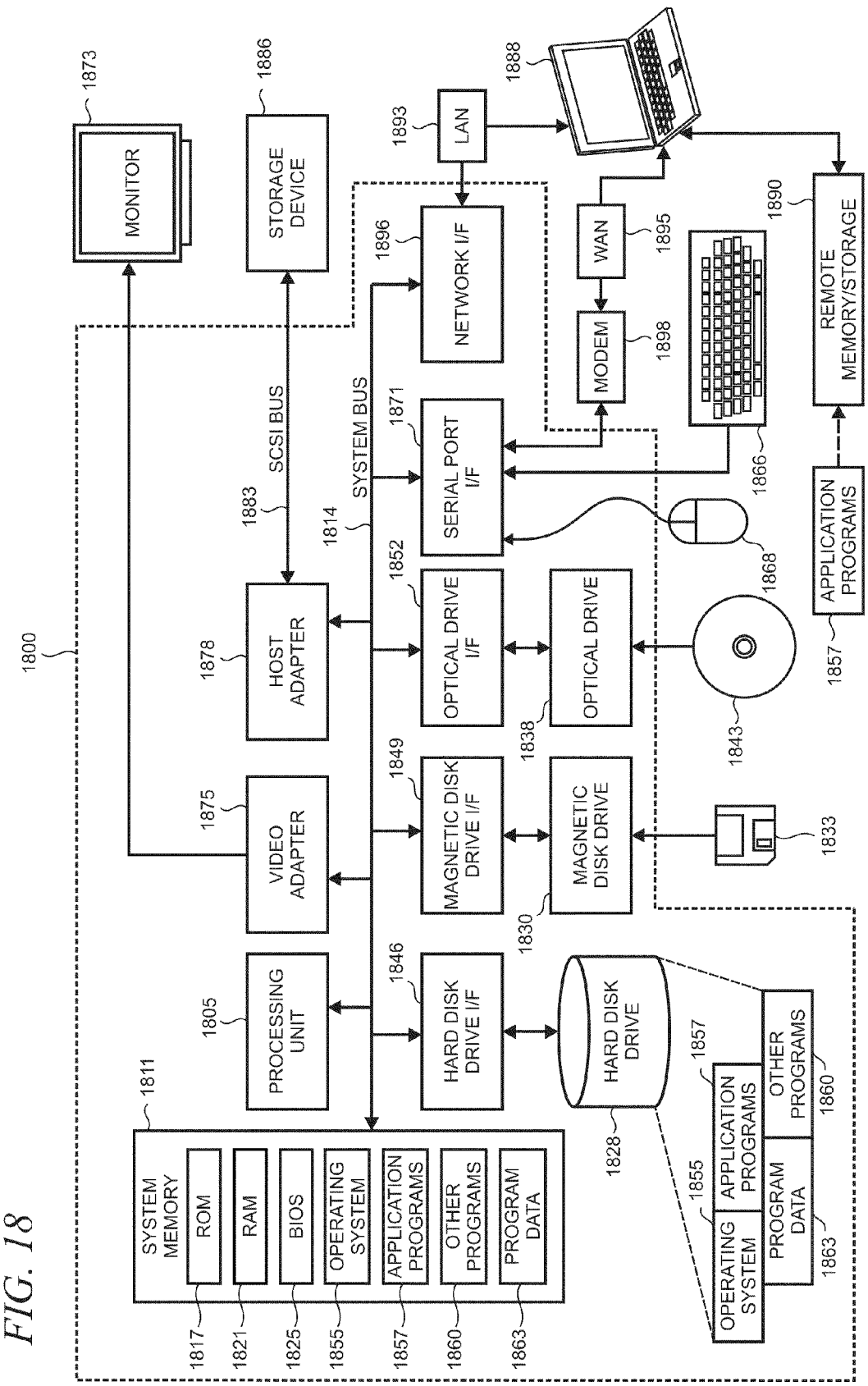
FIG. 18 is a simplified block diagram of an illustrative computer system such as a personal computer (PC) or server with which the present line segmentation may be implemented.

FIG. 18 is a simplified block diagram of an illustrative computer system 1800 such as a personal computer (PC) or server with which the present line segmentation may be implemented. Computer system 1800 includes a processing unit 1805, a system memory 1811, and a system bus 1814 that couples various system components including the system memory 1811 to the processing unit 1805. The system bus 1814 may be any of several types of bus structures including a memory bus or memory controller, a peripheral bus, and a local bus using any of a variety of bus architectures. The system memory 1811 includes read only memory (ROM) 1817 and random access memory (RAM) 1821. A basic input/output system (BIOS) 1825, containing the basic routines that help to transfer information between elements within the computer system 1800, such as during start up, is stored in ROM 1817. The computer system 1800 may further include a hard disk drive 1828 for reading from and writing to an internally disposed hard disk (not shown), a magnetic disk drive 1830 for reading from or writing to a removable magnetic disk 1833 (e.g., a floppy disk), and an optical disk drive 1838 for reading from or writing to a removable optical disk 1843 such as a CD (compact disc), DVD (digital versatile disc), or other optical media. The hard disk drive 1828, magnetic disk drive 1830, and optical disk drive 1838 are connected to the system bus 1814 by a hard disk drive interface 1846, a magnetic disk drive interface 1849, and an optical drive interface 1852, respectively. The drives and their associated computer readable media provide non-volatile storage of computer readable instructions, data structures, program modules, and other data for the computer system 1800. Although this illustrative example shows a hard disk, a removable magnetic disk 1833, and a removable optical disk 1843, other types of computer readable media which can store data that is accessible by a computer such as magnetic cassettes, flash memory cards, digital video disks, data cartridges, random access memories (RAMs), read only memories (ROMs), and the like may also be used in some applications of the present line segmentation. In addition, as used herein, the term computer readable medium includes one or more instances of a media type (e.g., one or more magnetic disks, one or more CDs, etc.).

A number of program modules may be stored on the hard disk, magnetic disk 1833, optical disc 1843, ROM 1817, or RAM 1821, including an operating system 1855, one or more application programs 1857, other program modules 1860, and program data 1863. A user may enter commands and information into the computer system 1800 through input devices such as a keyboard 1866 and pointing device 1868 such as a mouse. Other input devices (not shown) may include a microphone, joystick, game pad, satellite disk, scanner, or the like. These and other input devices are often connected to the processing unit 1805 through a serial port interface 1871 that is coupled to the system bus 1814, but may be connected by other interfaces, such as a parallel port, game port, or universal serial bus ("USB"). A monitor 1873 or other type of display device is also connected to the system bus 1814 via an interface, such as a video adapter 1875. In addition to the monitor 1873, personal computers typically include other peripheral output devices (not shown), such as speakers and printers. The illustrative example shown in FIG. 18 also includes a host adapter 1878, a Small Computer System Interface (SCSI) bus 1883, and an external storage device 1886 connected to the SCSI bus 1883.

The computer system 1800 is operable in a networked environment using logical connections to one or more remote computers, such as a remote computer 1888. The remote computer 1888 may be selected as another personal computer, a server, a router, a network PC, a peer device, or other common network node, and typically includes many or all of the elements described above relative to the computer system 1800, although only a single representative remote memory/storage device 1890 is shown in FIG. 18. The logical connections depicted in FIG. 18 include a local area network ("LAN") 1893 and a wide area network ("WAN") 1895. Such networking environments are often deployed, for example, in offices, enterprise-wide computer networks, intranets, and the Internet.

When used in a LAN networking environment, the computer system 1800 is connected to the local area network 1893 through a network interface or adapter 1896. When used in a WAN networking environment, the computer system 1800 typically includes a broadband modem 1898, network gateway, or other means for establishing communications over the wide area network 1895, such as the Internet. The broadband modem 1898, which may be internal or external, is connected to the system bus 1814 via a serial port interface 1871. In a networked environment, program modules related to the computer system 1800, or portions thereof, may be stored in the remote memory storage device 1890. It is noted that the network connections shown in FIG. 18 are illustrative and other means of establishing a communications link between the computers may be used depending on the specific requirements of an application of line segmentation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for segmenting words from a textual line image, the method comprising the steps of:
   extracting features from the textual line image using a featurization component of a line segmentation engine residing on a computer system;
   calculating breaks using the extracted features using the line segmentation engine;
   using a classifier of the line segmentation engine for classifying each of the breaks into classes, the classes including an inter-word break class and an inter-character break class, and for determining probabilities that classified breaks are members of the classes; and
   segmenting words using a word break engine residing on the computer system, the words being segmented from the textual line image using the breaks and probabilities.

2. The method of claim 1 in which the extracted features are selected from ones of absolute features, relative line features, relative break features, relative ink features, relative ink-to-ink features, relative break proximity features, or word recognition features.

3. The method of claim 2 in which the absolute features are selected from one or more of break width in pixels, distribution of all break widths in pixels, x height in pixels, stroke width in pixels, textual line image height in pixels, textual line image width in pixels, total break width in pixels, ink width in pixels, ink height in pixels, distribution of ink-to-ink widths in pixels, or ink-to-ink area.

4. The method of claim 3 in which the distribution of all break widths includes at least one of $90^{th}$ percentile of the distribution, $50^{th}$ percentile of the distribution, $10^{th}$ percentile of the distribution, or a number of breaks in the textual line image.

5. The method of claim 3 in which the distribution of ink-to-ink widths includes at least one of $100^{th}$ percentile of the distribution, $90^{th}$ percentile of the distribution, $50^{th}$ percentile of the distribution, $10^{th}$ percentile of the distribution, or $0^{th}$ percentile of the distribution.

6. The method of claim 2 in which the relative line features are selected from one or more of estimated number of characters, number of breaks per estimated number of characters, all breaks width per line width, or median break width per x-height.

7. The method of claim 2 in which the relative break features are selected from one or more of break width per x-height, break width per $90^{th}$ percentile break distribution, break width per $50^{th}$ percentile break distribution, break width per $10^{th}$ percentile break distribution, break width per previous break width, or break width per next break width.

8. The method of claim 2 in which the relative ink features are selected from one or more of distance from ink bottom to baseline per x-height and distance from ink top to x-height per x-height.

9. The method of claim 2 in which the relative ink-to-ink features are selected from one or more of $100^{th}$ percentile of ink-to-ink width distribution per x-height, $90^{th}$ percentile of ink-to-ink width distribution per x-height, $60^{th}$ percentile of ink-to-ink width distribution per x-height, $10^{th}$ percentile of ink-to-ink width distribution per x-height, $0^{th}$ percentile of ink-to-ink width distribution per x-height, $100^{th}$ percentile of ink-to-ink width distribution per median break width, $90^{th}$ percentile of ink-to-ink width distribution per median break width, $60^{th}$ percentile of ink-to-ink width distribution per median break width, $10^{th}$ percentile of ink-to-ink width distribution per median break width, $0^{th}$ percentile of ink-to-ink width distribution per median break width, or ink-to-ink area per effective ink-to-ink height.

10. The method of claim 2 in which the relative break proximity features are selected from one or more of surrounding break width per x-height or surrounding break width per median break width.

11. The method of claim 2 in which the word recognition features are selected from one or more of word confidence, character confidence for each character in a word, word frequency as reported by a language model, advanced language model features, or word length in characters.

12. The method of claim 1 in which the classifier is selected from one of decision tree classifier, AdaBoost classifier that is configured on top of the decision tree classifier, clustering classifier, neural network classifier, or iterative gradient descender classifier.

13. The method of claim 1 in which the classifier is trained using results provided by engines which are located upstream or downstream of the featurization component and classifier.

14. The method of claim 1 in which the classifier is trained using an independent scope implementation.

15. A method for segmenting and recognizing words in a textual line image, the method comprising the steps of:
   applying featurization to the textual line image to extract numeric features from which breaks are calculated using a featurization component of a line segmentation engine residing on a computer system;
   classifying the breaks into one of two classes including an inter-word break class or an inter-character break class using a classifier of the line segmentation engine;
   determining probabilities that the classified breaks are validly classified into the one of two classes using the classifier;
   extracting word features, using the featurization component, from words in the textual line image, the word features including at least one of word confidence, character confidence, word frequency, grammar, or word length; and
   selecting, with use of the line segmentation engine, a line segmentation using the extracted numeric features, the extracted word features, and the probabilities that the classified breaks are validly classified.

16. An optical character recognition system architecture, comprising:
   one or more pre-processing stages configured for providing a gray-scale textual line image;
   a line segmentation engine that implements a featurization component and a break classifier, the featurization component being configured for extracting features from the textual line image to calculate breaks in the textual line image, and the break classifier being configured for i) classifying the breaks into classes including an inter-word break class and an inter-character break class, and for ii) determining probabilities that given breaks are members of the classes; and
   one or more post-processing stages configured for receiving the classified breaks and probabilities and for detecting words in the textual line image using the received classified breaks and probabilities.

17. The optical character recognition system architecture of claim 16 further including a word break lattice engine configured for generating a word break lattice including one or more words using the breaks in the textual line image.

18. The optical character recognition system architecture of claim 17 further including a word recognizer that is combined with the line segmentation engine, the word recognizer being configured to extract word features from each of the words in the word lattice.

19. The optical character recognition system architecture of claim 18 further including a word break beam search engine configured for picking a line segmentation using the extracted word features and the extracted textual line features.

* * * * *